United States Patent
Seto et al.

(10) Patent No.: US 11,654,726 B2
(45) Date of Patent: May 23, 2023

(54) PNEUMATIC TIRE (71) Applicant: Sumitomo Rubber Industries, Ltd., Kobe (JP)

(72) Inventors: Mikita Seto, Kobe (JP); Takashi Okada, Kobe (JP); Satoshi Wada, Yokohama (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 210 days.

(21) Appl. No.: 17/133,865

(22) Filed: Dec. 24, 2020

(65) Prior Publication Data

US 2021/0197626 A1 Jul. 1, 2021

(30) Foreign Application Priority Data

Dec. 26, 2019 (JP) .............................. JP2019-236951

(51) Int. Cl.
*B60C 13/00* (2006.01)
(52) U.S. Cl.
CPC .................................. *B60C 13/001* (2013.01)
(58) Field of Classification Search
CPC ....... B60C 13/001; B60C 13/02; B60C 13/00; B60C 11/01
See application file for complete search history.

(56) References Cited

U.S. PATENT DOCUMENTS

2019/0160887 A1* 5/2019 Wakasugi ............. B60C 13/001

FOREIGN PATENT DOCUMENTS

| JP | 11-321243 A | 11/1999 | |
|----|----|----|----|
| JP | 2003-252011 A1 | 9/2003 | |
| JP | 2004-17828 A | 1/2004 | |
| JP | 2015042536 A * | 3/2015 | ........... B60C 13/001 |
| WO | WO 2019/111828 A1 | 6/2019 | |

OTHER PUBLICATIONS

JP 2015-042536 Machine Translations; Kaneko, Takeshi (Year: 2015).*
Extended European Search Report for European Application No. 20215436.5, dated Apr. 19, 2021.

* cited by examiner

*Primary Examiner* — Robert C Dye
*Assistant Examiner* — Nicholas J Weiler
(74) *Attorney, Agent, or Firm* — Birch, Stewart, Kolasch & Birch, LLP (57) ABSTRACT

A pneumatic tire comprises a sidewall portion of which outer surface is provided with a decorative portion extending in the tire circumferential direction in an arc shape. The decorative portion is formed from a first pattern area and a second pattern area having different surface aspects. When the decorative portion is divided into a number N of decorative zones (N>2) by equally-spaced parallel straight lines which are perpendicular to a reference center line extending in a tire radial direction, percentages of occupied area of the first pattern area in the respective decorative zones are gradually increased from the radially innermost decorative zone to the radially outermost decorative zone.

20 Claims, 6 Drawing Sheets

PNEUMATIC TIRE

TECHNICAL FIELD

The present invention relates to a pneumatic tire, more particularly to a decorative portion of a tire sidewall portion.

BACKGROUND ART

In a pneumatic tire, there is a possibility that convexoconcave occurs on the outer surface of the tire especially in the sidewall portions due to the influence of overlap jointing of ends of a carcass ply strip and the like. Such convexoconcave does not affect running performance of the tire. However, from an aesthetic point of view, it is desirable that convexoconcave is not noticeable.

The following patent document 1 discloses a pneumatic tire, wherein the outer surface of the sidewall portion is provided with a decorative portion extending in the tire circumferential direction in order to make convexoconcave occurred on the sidewall portion unnoticeable.

Patent Document 1: Japanese Patent Application Publication No. 2004-17828

SUMMARY OF THE INVENTION

Problems to be Solved by the Invention

The decorative portion disclosed in the patent document 1 exhibits a certain degree of effect on making the convexoconcave on the sidewall portion unnoticeable. In recent years, however, users have demanded further improvements to such effects.

In view of the above circumstances, the present invention was made, and a primary objective thereof is to provide a pneumatic tire of which appearance can be improved by making convexoconcave on the sidewall portion inconspicuous.

According to the present invention, a pneumatic tire comprises a sidewall portion having an outer surface provided with a decorative portion extending in the circumferential direction of the tire in an arc shape, wherein the decorative portion comprises a first pattern area having a surface aspect, and a second pattern area having a surface aspect different from the surface aspect of the first pattern area, wherein when the decorative portion is divided into a number N of decorative zones (N is an integer of 3 or more) by parallel straight lines which are perpendicular to a reference center line which extends in a radial direction of the tire through the center in the tire circumferential direction of the decorative portion when viewed perpendicularly so that, at the position of the reference center line, the decorative portion is divided into the number N equal parts by the parallel straight lines, percentages of occupied area of the first pattern area in the respective decorative zones are gradually increased from the radially innermost one to the radially outermost one of the number N of the decorative zones at the position of the reference center line.

One of the first pattern area and the second pattern area may be provided with a plurality of linear pattern elements.

One of the first pattern area and the second pattern area may be provided with micro-protrusions.

The other of the first pattern area and the second pattern area may be provided with a substantially smooth surface.

The first pattern area and the second pattern area may be bounded by first boundaries extending parallel to the reference center line.

The first pattern area and the second pattern area may be bounded by second boundaries extending orthogonally to the first boundaries.

The lengths of the first boundaries may be greater than the length of the second boundaries.

The lengths of the first boundaries may be not more than 10 times the length of the second boundaries.

The percentage of the occupied area of the first pattern area in the radially outermost decorative zone may be in a range from 80% to 100%.

The percentage of the occupied area of the first pattern area in the radially innermost decorative zone may be in a range from 30% to 50%.

The decorative portion may comprise an inner decorative zone which is located on the inside in a tire radial direction along the reference center line, than a first decorative zone which is the radially innermost one of the number N of the decorative zones, and which has the same dimension in the above-said tire radial direction as the first decorative zone, and the percentage of the occupied area of the first pattern area in the first decorative zone may be greater than the percentage of the occupied area of the first pattern area in the inner decorative zone.

The decorative zones include a first decorative zone which is innermost in the above-said tire radial direction, a second decorative zone which is located on the outside in the above-said tire radial direction of the first decorative zone, and a third decorative zones which is outermost in the above-said tire radial direction, and a first quotient of the percentage of the occupied area of the first pattern area in the second decorative zone divided by the percentage of the occupied area of the first pattern area in the first decorative zone may differ from a second quotient of the percentage of the occupied area of the first pattern area in the third decorative zone divided by the percentage of the occupied area of the first pattern area in the second decorative zone.

Therefore, in the pneumatic tire according to the present invention, the pattern of the decorative portion formed by the first pattern area and the second pattern area is varied in a certain regularity along the direction of the reference center line. Further, the pattern of the decorative portion is varied in three or more steps. Thereby, the pneumatic tire according to the present invention is provided, in the sidewall portion, with a complex (non-uniform) unique decorative pattern, while making convexoconcave of the sidewall portion less noticeable, and the appearance of the tire can be improved.

DESCRIPTION OF THE PREFERRED EMBODIMENTS

The present invention can be applied to pneumatic tires for various vehicles, e.g. passenger cars, heavy duty vehicles such as truck and bus, motorcycles and the like.

Hereinafter, taking a pneumatic tire for passenger cars as an example, embodiments of the present invention will be described in detail in conjunction with accompanying drawings.

Figure 1:
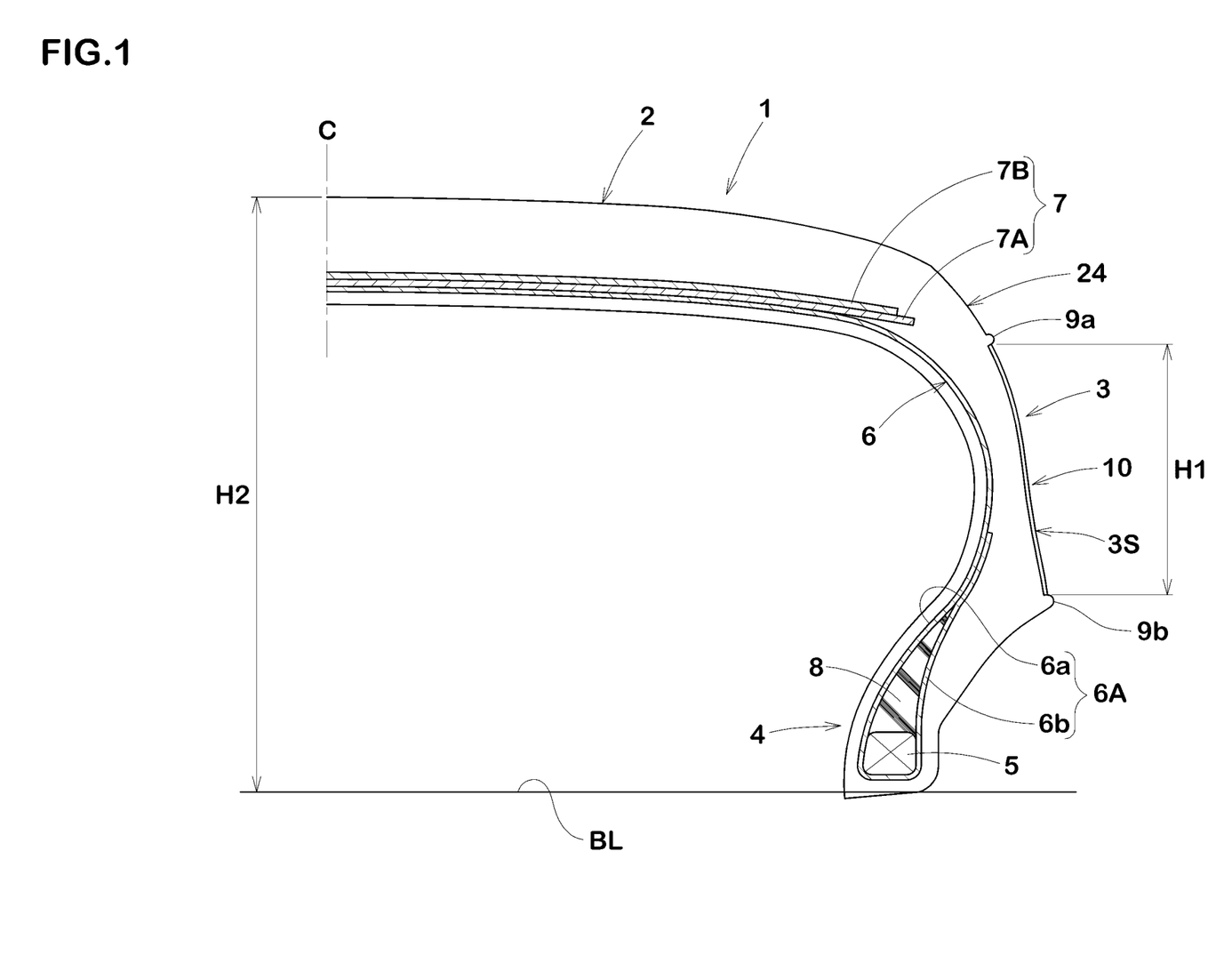
FIG. 1 is a cross-sectional partial view of a pneumatic tire as an embodiment of present invention.

FIG. 1 shows a cross-section of a part of a pneumatic tire 1 as an embodiment of present invention under its normally inflated unloaded state, taken along a meridian plane of the tire.

In this application including specification and claims, various dimensions, positions and the like of the tire refer to those under a normally inflated unloaded state of the tire unless otherwise noted.

The normally inflated unloaded state is such that the tire is mounted on a standard wheel rim and inflate to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure is the maximum air pressure for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like.

The term "tire radial direction" means a direction perpendicular to the tire rotational axis.

The term "tire axial direction" means a direction parallel to the tire rotational axis.

The term "tire circumferential direction" means a circumferential direction around the tire rotational axis.

The pneumatic tire 1 comprises a tread portion 2, a pair of axially spaced bead portions 4 each with a bead core 5 therein, a pair of sidewall portions 3 extending between tread edges and the bead portions 4, a carcass 6 extending between the bead portions 4, and a tread reinforcing belt 7 disposed radially outside the carcass 6 in the tread portion 2.

The carcass 6 comprises at least one carcass ply 6A, in the present embodiment, consists of one carcass ply 6A.
The carcass ply 6A extends between the bead portions 4 through the tread portion 2 and the sidewall portions 3 and is turned up around the bead core 5 in each of the bead portions 4 so as to form a pair of turned-up portions 6b and a main portion 6a therebetween. The carcass ply 6A in this example is composed of carcass cords arranged radially at an angle of 75 to 90 degrees with respect to the tire equator C. For example, organic fiber cords such as aromatic polyamide, rayon or the like can be suitably employed as the carcass cords.
The bead portions 4 are each provided with a bead apex rubber 8 disposed between the main portion 6a and the turned-up portion 6b of the carcass ply 6A to extend radially outward from the bead core 5.

The tread reinforcing belt 7 is composed of at least one ply, in the present embodiment, two cross plies 7A and 7B of belt cords. The belt cords of each ply 7A, 7B are arranged parallel with each other at an angle of from 15 to 45 degrees with respect to the tire equator C. For example, organic fiber cords such as aromatic polyamide, rayon or the like, or steel cords can be suitably employed as the belt cords.

At least one of, in the present embodiment, each of the sidewall portions 3 is provided, in the outer surface 3s thereof, with a decorative portion 10.

In the present embodiment, the decorative portion 10 is defined between two radially spaced circumferential ribs: a radially outer circumferential rib 9a and a radially inner circumferential rib 9b, which protrude from the outer surface of the sidewall portion 3 and extend in the tire circumferential direction.

such circumferential ribs 9a and 9b are however not essential. For example, one of, or both of them may be omitted. Further, instead of the protruding rib, for example, a groove may be used.

In the present embodiment, the radial dimension H1 in the tire radial direction (see FIG. 1) of the decorative portion 10 is set in a range from 40% to 70% of the cross sectional height H2 of the tire measured from a bead base line BL to a radially outermost point of the tread surface which usually occurs at the tire equator C. However, the radial dimension H1 may be arbitrarily set according to the position of the overlap joint of tire inside structures.

Figure 2:
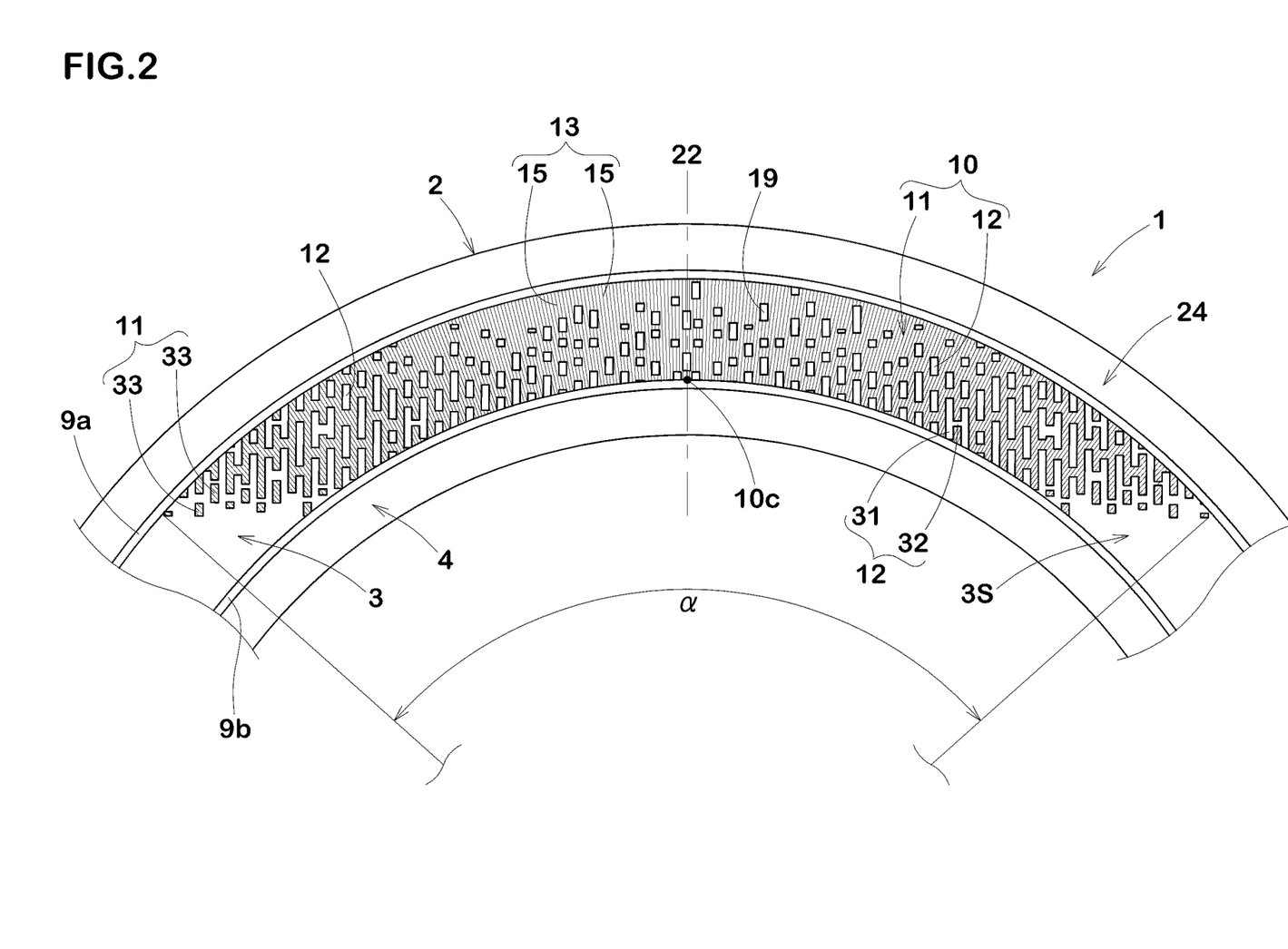
FIG. 2 is a partial side view of the pneumatic tire showing an example of the decorative portion in the outer surface of the sidewall portion.

FIG. 2 is a partial side view of the tire 1 showing an example of the decorative portion 10 formed in the outer surface 3s of the sidewall portion 3.
As shown, the decorative portion 10 extends in the tire circumferential direction in an arc shape.
In the present embodiment, the radial dimension H1 is constant in the tire circumferential direction.
In the present embodiment, the decorative portion 10 has a circumferential extent a in terms of an angle around the tire rotation axis as shown in FIG. 2. For example, the circumferential extent a is set in a range from 60 to 120 degrees.

A plurality of such decorative portions 10 may be provided in one sidewall portion 3.

In the decorative portion 10, markings such as letters and symbols indicating the tire manufacturer's name, brand name, size, etc. may be formed.

The decorative portion 10 is formed from a first pattern area 11 and a second pattern area 12.
The surface of the first pattern area 11 forms a part of the outer surface 3s of the sidewall portion 3, and
the surface of the second pattern area 12 forms a part of the outer surface 3s of the sidewall portion 3.
The surface of the second pattern area 12 has a different surface aspect than the surface of the first pattern area 11.

Here, the surface aspect is a comprehensive aspect including presence or absence of concavity and convexity, shapes of concavity and convexity, and sizes of concavity and convexity, and when at least one of them is different, these surface aspects are considered as being different from each other.

Figure 3:
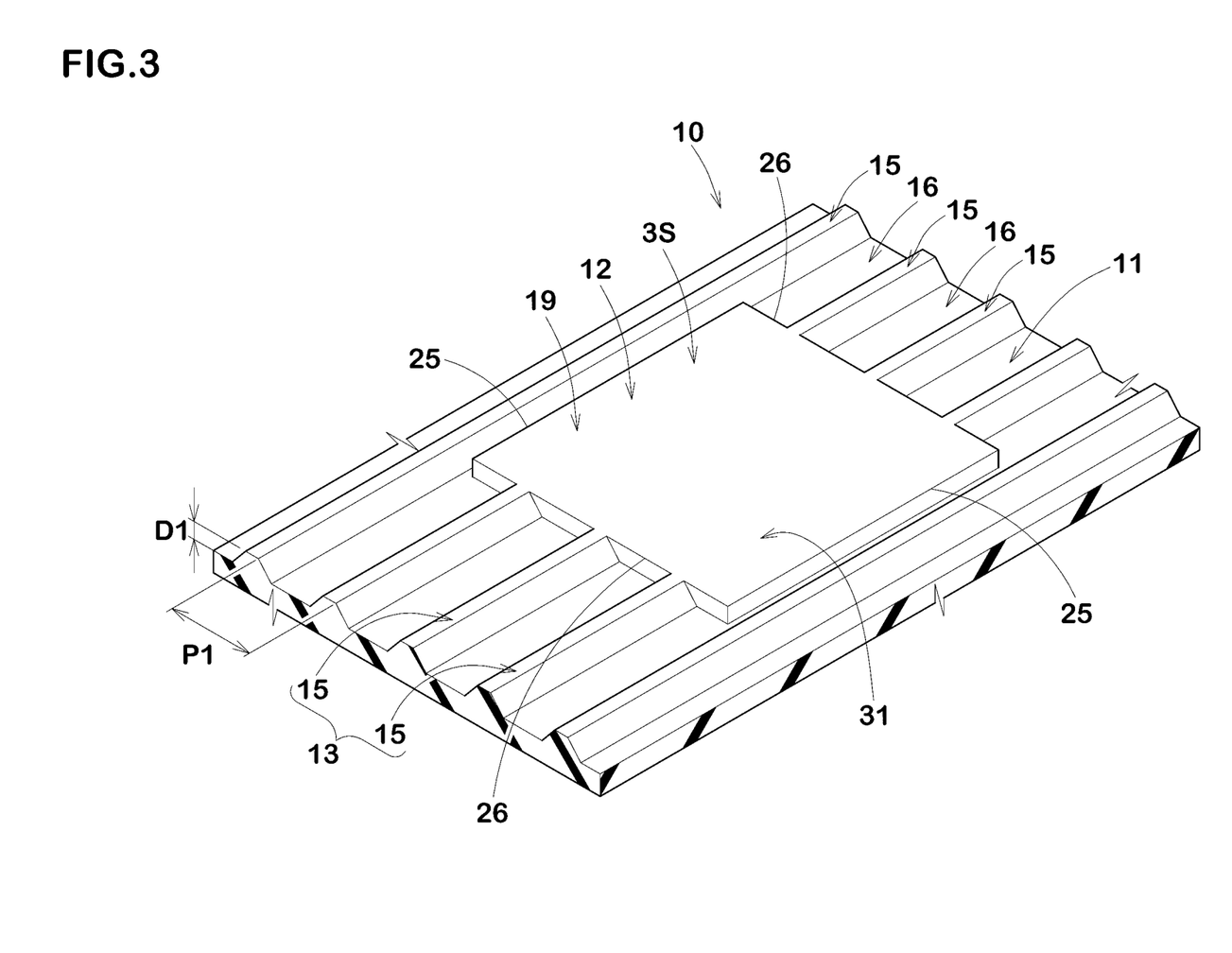
FIG. 3 is a perspective view showing an example of the first pattern area and an example of the second pattern area.

FIG. 3 is a perspective view showing an example of the first pattern area 11 and an example of the second pattern area 12.

One of the first pattern area 11 and the second pattern area 12, which is the first pattern area 11 in the present embodiment, is provided with an uneven surface.

The uneven surface in this example is formed by providing a plurality of linear pattern elements 13.

The linear pattern element 13 in this example is a ridge 15. In the present embodiment, the ridges 15 extend radially of the tire rotation axis as shown in FIG. 2 and are arranged in the tire circumference direction. Thus, between the ridges 15, grooves 16 are formed. The grooves 16 also extend radially of the tire rotation axis.

In FIG. 2, the ridges 15 are indicated by radial lines, and accordingly, the grooves 16 are spaces between the radial lines. The directions of the ridges 15 and the grooves 16 are not limited to the respective radial directions, for example, they may be inclined with respect to the respective radial directions. Further, the inclining directions may be changed between the decorative portions 10 when a plurality of the decorative portions 10 is provided.

In the linear pattern element 13 in the present embodiment, the top surfaces of the ridges 15 are the same level, in other words, the ridges 15 have a same protruding height.

In the cross section of the ridge 15 taken perpendicularly to the longitudinal direction thereof, the ridge 15 in this example has a trapezoidal cross-sectional shape as shown in FIG. 3 although not limited thereto. The ridge 15 may have a triangular cross-sectional shape, a semicircular cross-sectional shape, etc.

The arrangement pitches P1 in the tire circumferential direction between the ridges 15 and the groove depths D1 of the grooves 16 may be set arbitrarily. For example, the arrangement pitches P1 in terms of angles around the tire rotation axis can be set in a range from 0.1 to 0.3 degrees. For example, the groove depths D1 or the protruding heights of the ridges can be set in a range from 0.2 mm to 0.5 mm.

The other of the first pattern area 11 and the second pattern area 12, which is the second pattern area 12 in the present embodiment, is provided with a substantially smooth surface 19.

Here, the "substantially smooth surface" means that the roughness (arithmetic mean roughness Ra) of the surface is not more than 1.0 micrometers.

The second pattern area 12 having such smooth surface 19 can increase the amount of light reflection and make it brighter and more visible than the first pattern area 11 whose surface is uneven.

In the present embodiment, the smooth surface 19 of the second pattern area 12 is the same level as the top surfaces of the ridges 15 of the first pattern area 11, and forms a part of the outer surface 3s of the sidewall portion 3. But, it is also possible that the smooth surface 19 of the second pattern area 12 is the same level as the bottom surfaces of the grooves 16.

By the uneven surface formed by the linear pattern elements 13 and the smooth surface 19, the surface aspect of the first pattern area 11 with the linear pattern elements 13 differs from the surface aspect of the second pattern area 12 with the smooth surface 19. Therefore, the first pattern area 11 and the second pattern area 12 can differ from each other in the amount of light reflection and can increase the contrast between light and dark.

The decorative portion 10 is virtually-divided into a number N of decorative zones 21 by parallel straight lines, where N is an integer greater than or equal to 3. The intervals between the parallel straight lines are constant. The parallel straight lines each extend orthogonally to a reference center line 22. The reference center line 22 is a straight line passing through the center position 10c in the tire circumferential direction of the decorative portion 10, and the reference center line 22 is parallel with a tire radial direction at the center position 10c.

Along the reference center line 22, namely, at the position of the reference center line 22, the parallel straight lines divide the decorative portion 10 into the number N of equal parts. Accordingly, the decorative zones 21 all have the same dimension W1 in the reference center line 22's direction.

Figure 4:
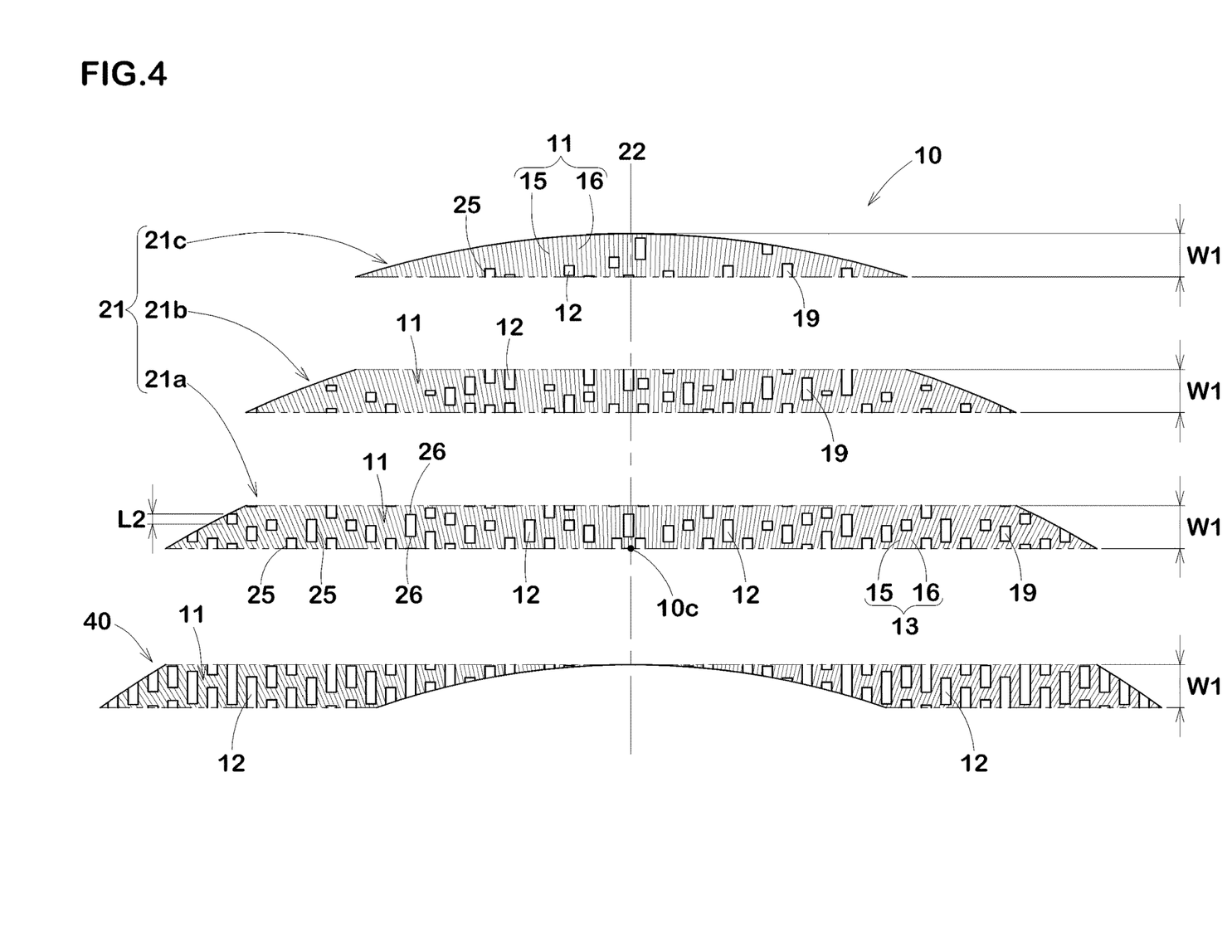
FIG. 4 shows the decorative portion, separating the decorative zones from each other.

FIG. 4 shows an example when the number N is 3, namely, the decorative portion 10 is divided into three decorative zones 21.

The decorative zones 21 include, in the radial direction along the reference center line 22, a radially outermost decorative region, a radially innermost decorative region, and at least one middle decorative region therebetween.

In the present embodiment, the three decorative zones 21 are the radially innermost first decorative zone 21a, one middle second decorative zone 21b radially outside thereof, and the radially outermost third decorative zone 21c.

In the present embodiment, as explained above, the decorative zones 21 (21a-21c) are virtually divided by the virtual parallel straight lines. But, it is also possible that the decorative zones 21 are actually divided by actual straight lines or linearly extending structures, for example, straight ribs and/or straight grooves (not circumferentially extending ribs or grooves in arc shapes), extending orthogonal to the reference center line 22.

In the present embodiment, the percentage of the occupied area of the first pattern area 11 in each of the decorative zones 21 is gradually increased toward the radially outer side of the tire, namely, gradually increased from the radially innermost decorative zone 21a to the radially outermost decorative zone 21c.

Incidentally, the percentage of the occupied area is the total area of the first pattern area 11 divided by the overall area of the decorative zone 21c and multiplied by 100. However, when the above-mentioned markings are provided in the decorative portion 10, the occupied area of the markings is excluded from the calculation of the overall area of each decorative zone 21.

In the present embodiment, as the percentage of the occupied area of the first pattern area 11 is varied as described above, the decorative portion 10 is provided with a pattern which is varied in a certain regularity along the direction of the reference center line 22.

Specifically, in the decorative portion 10 in the present embodiment, the decorative zones 21 are changed along the direction of the reference center line 22 with respect to the contrast between the first pattern area 11 and the second pattern area 12.

Further, the pattern of the decorative portion 10 is varied in three or more steps (by the first to third decorative zones 21a-21c in the present embodiment). Thereby, the tire 1 is provided, in the sidewall portion 3, with a decorative pattern which can present a complex (non-uniform) unique appearance on the tire. Such decorative pattern may improve the appearance of the tire by itself as well as by making convexoconcave in the sidewall portion 3 unnoticeable, which convexoconcave is caused on the outer surface 3s of the sidewall portion 3 by, for example, overlap jointing of ends of a carcass ply strip and the like.

In the decorative portion 10 in the present embodiment, since the occupied area percentage of the first pattern area 11 from which light reflection is relatively less, becomes larger as the decorative zone 21 is positioned outer side in the direction of the reference center line 22, if the tire is such that the above-mentioned convexoconcave of the sidewall portion 3 is more likely to occur near the shoulder portion 24 (or the radially outermost part of the sidewall portion as shown in FIGS. 1 and 2), it is effective to position the reference center line 22 at a position in the tire circumferential direction where the convexoconcave is liable to occur. This makes it possible to more effectively disguise the convexoconcave.

It is preferable that the incrementation of the occupied area percentage of the first pattern area 11 is such that, with respect to every two of the radially adjacent decorative zones 21, the occupied area percentage in the radially outer decorative zone 21 is not less than 1.3 times, more preferably not less than 1.4 times, but not more than 3.0 times, more preferably not more than 2.5 times the occupied area percentage in the radially inner decorative zone 21.

If less than 1.3 times, the change in the surface aspect is small, and it becomes difficult to provide a complex decorative pattern on the sidewall portion 3. If more than 3.0 times, the change in the surface aspect may be excessively large which may not be desirable for the appearance.

Further, the ratio of the occupied area percentage in the radially outer decorative zone 21 to the occupied area percentage in the radially inner decorative zone 21 in a set of two of the radially adjacent decorative zones 21 may be differed from that of another set of two of the radially adjacent decorative zones 21.

More specifically, in the present embodiment, a first ratio of the occupied area percentage of the first pattern area 11 in the second decorative zone 21b to the occupied area percentage of the first pattern area 11 in the first decorative zone 21a is differed from a second ratio of the occupied area percentage of the first pattern area 11 in the third decorative zone 21c to the occupied area percentage of the first pattern area 11 in the second decorative zone 21b.

Thereby, a change of the decorative pattern from the first decorative zone 21a to the second decorative zone 21b becomes different from a change of the decorative pattern from the second decorative zone 21b to the third decorative zone 21c. Therefore, it is possible to give a more complex decorative pattern to the sidewall portion 3.

For example, by setting the first ratio to be larger than the second ratio, it is possible to make convexoconcave occurred in a range from the bead portion 4 to the sidewall portion 3 less noticeable effectively.

Preferably, the occupied area percentage of the first pattern area 11 in the radially outermost decorative zone 21 (third decorative zone 21c) is set in a range from 80% to 100%, more preferably 85% to 100%. Thereby, in the vicinity of the above-said shoulder portion 24, the percentage of the occupied area of the first pattern area 11 is increased, and convexoconcave occurred in the shoulder portion 24 becomes less noticeable.

On the other hand, by decreasing the occupied area percentage of the first pattern area 11 within the above ranges, the occupied area percentage of the second pattern area 12 is increased. This makes it possible to give a complex decorative pattern to the sidewall portion 3.

From this point of view, the occupied area percentage of the first pattern area 11 is more preferably not more than 95%, Preferably, the occupied area percentage of the first pattern area 11 in the radially innermost decorative zone 21 (first decorative zone 21a) is set in a range from 30% to 50%, more preferably 35% to 50%. Thereby, in the vicinity of the bead portion 4, the percentage of the occupied area of the first pattern area 11 is increased, and it becomes possible to make convexoconcave occurred in the vicinity of the bead portion 4 less noticeable.

If the occupied area percentage in the radially innermost decorative zone 21 is more than 50%, it becomes difficult to secure effective change in the occupied area percentage between the decorative zones 21. From this point of view, the occupied area percentage of the first pattern area 11 in the radially innermost decorative zone 21 is more preferably set to be not more than 45%.

Preferably, the occupied area percentage of the first pattern area 11 in the middle decorative zone or zones 21 (second decorative zone 21b) is set in a range from 55% to 75%. If more than 75%, it becomes difficult to secure effective change in the occupied area percentage between the radially outermost decorative zone 21 and the middle decorative zone 21. From this point of view, the occupied area percentage in the middle decorative zone or zones 21 is more preferably set to be not more than 70%. On the other hand, if less than 55%, it becomes difficult to secure effective change in the occupied area percentage between the middle decorative zone 21 and the radially inner decorative zone 21.

From this point of view, the occupied area percentage in the middle decorative zone or zones 21 is more preferably not less than 60%. Thereby, the pattern of the decorative portion 10 is varied effectively from the radially innermost decorative zone 21 (first decorative zone 21a) to the radially outermost decorative zone 21 (third decorative zone 21c) to make the convexoconcave less noticeable.

As shown in FIG. 4, the decorative portion 10 may include an inner decorative zone 40, which is positioned on the inner side in the reference center line 22's direction than the radially innermost decorative zone 20 (first decorative zone 21a) of the number N of the decorative zone 20, and which has the same dimension W1 in the reference center line 22's direction as the radially innermost decorative zone 20 (21a). In this case, it is preferable that the occupied area percentage of the first pattern area 11 in the radially innermost decorative zone 21 (21a) is greater than the occupied area percentage of the first pattern area 11 in the inner decorative zone 40. Accordingly, the occupied area percentage of the first pattern area 11 becomes increased from the inner decorative zone 40 to the radially outermost decorative zone 21 (21c). Therefore, the contrast between the first pattern area 11 and the second pattern area 12 can be effectively varied along the reference center line 22's direction.

Preferably, the ratio of the occupied area percentage of the first pattern area 11 in the radially innermost decorative zone 21 (21a) to the occupied area percentage of the first pattern area 11 in the inner decorative zone 40 is not less than 1.3, more preferably not less than 1.4, but not more than 3.0, more preferably not more than 2.5.

when there are a plurality of the inner decorative zones 40 on the inner side than the radially innermost decorative zone 20, it is preferable that the occupied area percentage of the first pattern area 11 is increased toward the radially outside in the reference center line 22's direction.

Figure 5:
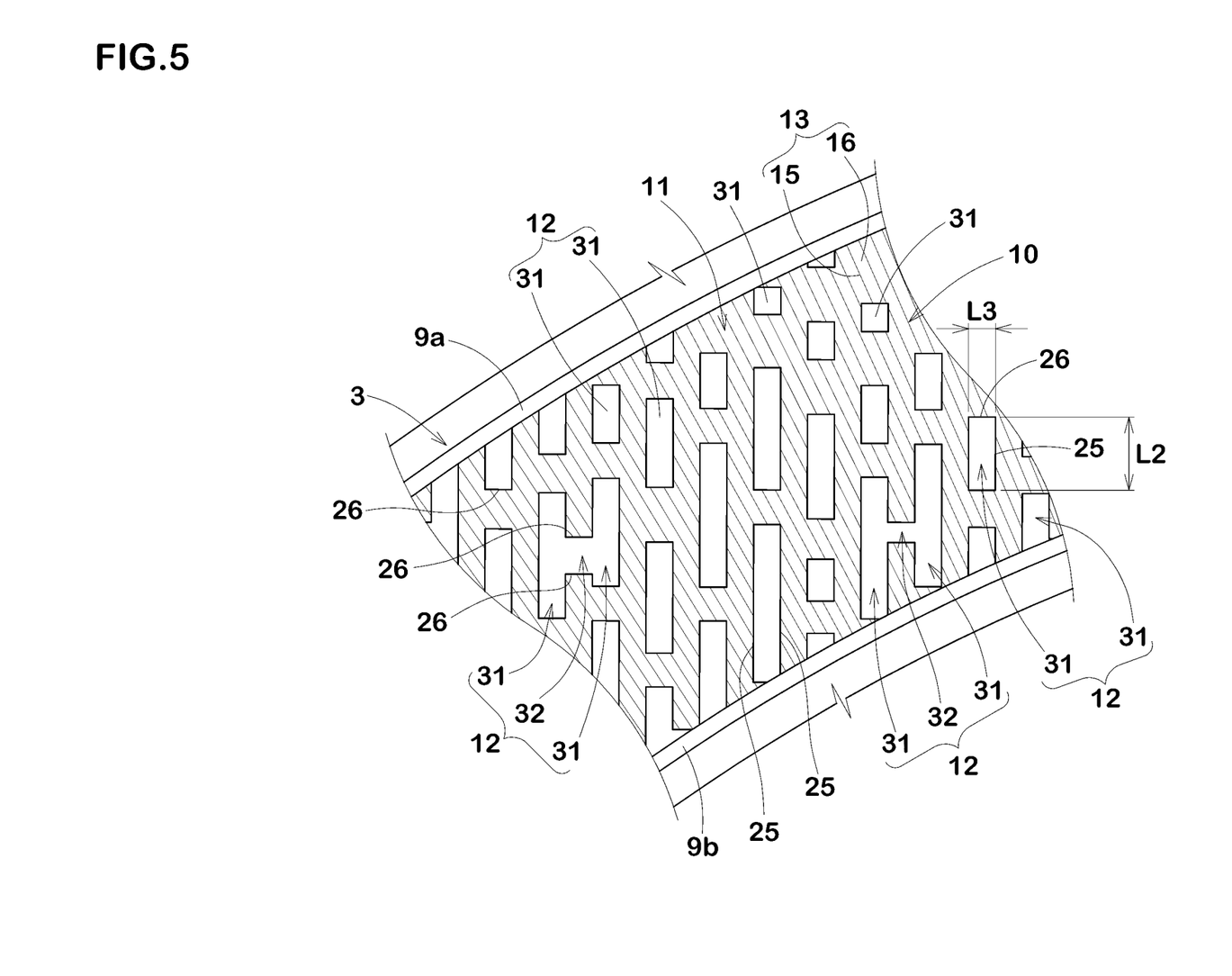
FIG. 5 is an enlarged view of a part of the decorative portion shown in FIG. 2.

In the decorative portion 10 in the present embodiment, as shown in FIG. 5, the first pattern area 11 and the second pattern area 12 are bounded by first boundaries 25 extending parallel to the reference center line 22.

Therefore, at least some of the first boundaries 25 intersect with the ridges 15 and grooves 16 which extend radially of the tire rotation axis. As a result, the sidewall portion 3 is provided with a complex decorative pattern.

Further, since the first boundaries 25 extend in the same direction, it becomes easy to machine shaping portions, e.g., convexities, grooves, etc. of a tire vulcanization mold for shaping the first pattern area 11 and the second pattern area 12, which may reduce the increase in the manufacturing time and costs of the tire vulcanization mold.

In the present embodiment, the first boundaries 25 are parallel to the reference center line 22. But, the first boundaries 25 are not limited to such arrangement. For example, the first boundaries may be arranged so as to extend radially of the tire rotation axis.

In the decorative portion 10 in the present embodiment, in addition to the first boundaries 25, the first pattern area 11 and the second pattern area 12 are also bounded by second boundaries 26 orthogonal to the first boundaries 25. Since the second boundaries 26 extend in the same direction, the increase in the manufacturing time and costs of the tire vulcanization mold may be suppressed.

In the present embodiment, the second boundaries 26 have the same length L3, which may effectively suppress the increase in the manufacturing time and costs of the vulcanization mold. The decorative portion 10 may include plural kinds of the second boundaries 26 having different lengths L3. Such decorative portion 10 makes it possible to give a more complex decorative pattern to the sidewall portion 3.

By the first boundaries 25 and the second boundaries 26, the second pattern area 12 in the present embodiment is partitioned into first pattern units 31 and second pattern units 32. Each of the first pattern units 31 and the second pattern units 32 at least partially adjoins the first pattern area 11 (linear pattern elements 13) through the first and second boundaries 25 and 26.

The first pattern unit 31 is defined by two of the first boundaries 25 adjacent to each other in the direction orthogonal to the reference center line 22, and two of the second boundaries 26 connecting between the above-said two of the first boundaries 25 so that the first pattern unit 31 has a substantially rectangular shape as shown in FIG. 5.

The second pattern unit 32 is defined by two of the second boundaries 26 extending between two of the first pattern units 31 adjacent to each other in the direction orthogonal to the reference center line 22. The above-said two of the second boundaries 26 are spaced apart from both ends of each first pattern unit 31 in the reference center line 22's direction. The above-said two of the first pattern units 31 and the second pattern unit 32 therebetween are united and form the substantially H-shaped second pattern area 12.

Since the decorative portion 10 in the present embodiment is provided with the first pattern units 31 and the second pattern units 32 as the second pattern area 12, the sidewall portion 3 can be provided with a more complex decorative pattern. Thus, the decorative portion 10 can effectively make convexoconcave occurred in the sidewall portion 3 less noticeable.

The first and second pattern units 31 and 32 may be arranged with a certain regularity or may be randomly arranged. By randomly arranging the first and second pattern units 31 and 32, the decorative pattern of the sidewall portion 3 can be made more complex.

The first pattern area 11 may include a third pattern area 33 surrounded by the second pattern area 12 through the first and second boundaries 25 and 26 as shown in FIG. 2.

The third pattern area 33 in this example is formed in a substantially rectangular shape as shown in FIG. 2. By providing such third pattern areas 33, the decorative portion 10 can make the decorative pattern of the sidewall portion 3 more complex.

In the present embodiment, the second boundaries 26 have a length L3, and the first boundaries 25 have lengths L2 some of which are greater than the length L3 of the second boundaries 26. As a result, as shown in FIG. 5, some of the first pattern units 31 of the second pattern area 12, and some of the third pattern areas 33 of the first pattern area 11 become longer in the direction of the reference center line 22 than the orthogonal direction to the reference center line 22. Thereby, the decorative portion 10 can provide a decorative pattern for the sidewall portion 3, which is complex but has a certain regularity, thereby further improving the appearance of the tire 1.

In order to effectively derive such advantageous effect, the lengths L2 of the first boundaries 25 are preferably set in a range from 1 to 10 times the length L3 of the second boundaries 26.

By setting the lengths L2 to be greater than the length L3, the first pattern unit 31 and the third pattern area 33 become longer in the direction of the reference center line 22. By setting the lengths L2 to be less than 10 times the length L3, it is possible to prevent the first pattern unit 31 and the third pattern area 33 from becoming excessively long, and prevent the decorative pattern from becoming monotonous. In view of this, it is preferred that the lengths L2 are set to be not less than 5 times, but not more than 8 times the length L3.

In the decorative portion 10 in the present embodiment, since the first boundaries 25 include those having different lengths L2, the decorative portion 10 gives a more complex decorative pattern to the sidewall portion 3. In order to effectively derive such advantageous effect, it is preferred that the first boundaries 25 have four to ten different lengths L2.

The average value of the lengths L2 of the first boundaries 25 in each decorative zone 21 may be set smaller as the decorative zone 21 is located outer side in a tire radial direction as shown in FIG. 4. This gives further variations to the pattern of the decorative portion 10 in the tire radial direction. Furthermore, since the area of the second pattern area 12 becomes smaller as the lengths L2 of the first boundaries 25 become smaller in the present embodiment, the percentage of the occupied area of the first pattern area 11 in the decorative zone 21 becomes increased as the decorative zone 21 is positioned outer side in the tire radial direction. Therefore, the tire 1 in the present embodiment can provide a complex decorative pattern on the sidewall portion 3 to improve the appearance of the tire.

In the present embodiment, one of the first pattern area 11 and the second pattern area 12, specifically the first pattern area 11, is provided with the uneven surface formed by the linear pattern elements 13. The uneven surface is however, not limited to such linear pattern elements 13.

Figure 6:
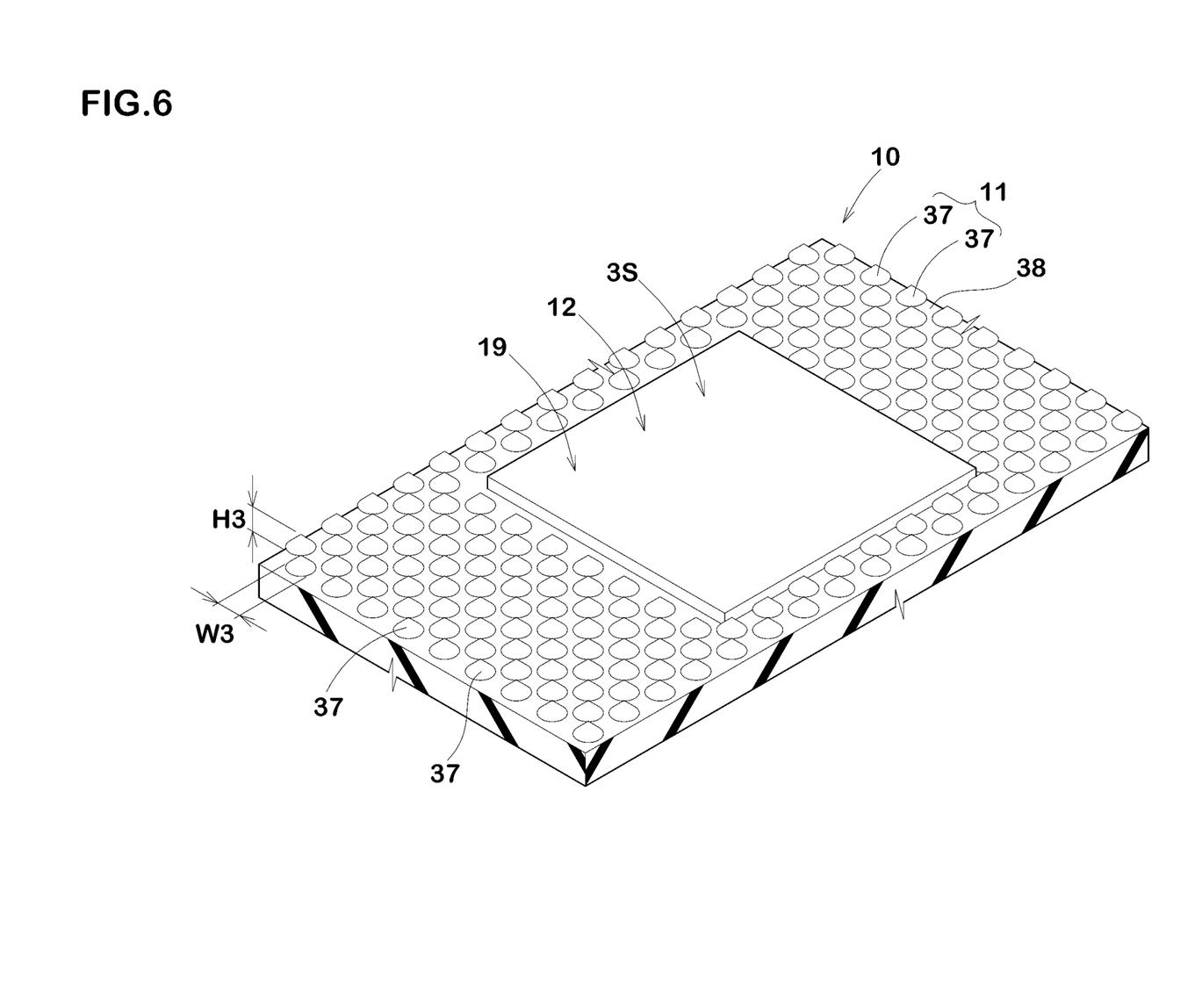
FIG. 6 is a perspective view showing the second pattern area combined with another example of the first pattern area.

FIG. 6 shows another example of the uneven surface. In this example, the uneven surface is formed by a large number of micro-protrusions 37 protruding perpendicularly to the decorative portion 10. When the decorative portion 10 is viewed perpendicularly thereto, the shapes of the micro-protrusions 37 may be circles, ovals, rectangles, triangles or the like. In the example shown in FIG. 6, the shapes of the micro-protrusions 37 are circles having the same size.

Similarly to the linear pattern elements 13, such micro-protrusions can reduce the amount of light reflection as compared to the smooth surface 19. Therefore, the decorative portion 10 can increase the contrast of light and dark between the first pattern area 11 and the second pattern area 12. Dimensions (protruding height H3 and width/diameter W3 shown in FIG. 6) of the micro-protrusions 37 are preferably set in a range from 0.01 mm to 0.3 mm for example, but the dimensions are not limited thereto.

The uneven surface formed by the micro-protrusions 37 is provided on the first pattern area 11 instead of the former example formed by the linear pattern elements 13, in combination with the smooth surface 19 of the second pattern area 12.

As another embodiment of the present invention, it is also possible that the first pattern area 11 is provided with the smooth surface 19, and the second pattern area 12 is provided with the uneven surface formed by, for example, the linear pattern elements 13 or the micro-protrusions 37. As still another embodiment of the present invention, it is also possible that the first pattern area 11 and the second pattern area 12 are provided with different uneven surfaces, for example, one of which is formed by the linear pattern elements 13 and the other is formed by the micro-protrusions 37.

Anyway, according to the present invention, the first pattern area 11 and the second pattern area 12 of the decorative portion 10 are provided with different surface aspects.

Although the number N of the decorative zones 21 in the illustrated embodiment is three, the number N can be increased to four or more, for example, in order that the change of the decorative pattern from the radially innermost decorative zone 21 (21a) to the radially outermost decorative zone 21 (21c) becomes more smooth. However, if the number N of the decorative zones 21 is excessively large, the manufacturing time and cost of the vulcanization mold may increase, and also there is a possibility that the effect to make the convexoconcave less noticeable is reduced. Therefore, it is preferable that the number N is not more than 10, more preferably not more than 8, still more preferably not more than 5.

While detailed description has been made of preferable embodiments of the present invention, the present invention can be embodied in various forms without being limited to the illustrated embodiments.

Comparison Tests

[Test A]

Pneumatic tires of size 225/45ZR18 having the internal structure shown in FIG. 1 were experimentally manufactured as test tires (working example tires Ex. 1-Ex. 6 and a comparative example tire Ref. 1), changing the decorative zones in the percentage of the occupied area of the first pattern area as shown in Table 1.

In the working example tires Ex. 1-Ex. 6, when each decorative portion was partitioned into three decorative zones, the percentage of the occupied area of the first pattern area was increased from the radially innermost decorative zone to the radially outermost decorative zone.

On the other hand, in the decorative portion of the comparative example tire Ref. 1, the first pattern area was distributed evenly in the direction of the reference center line so that even if the decorative portion was partitioned into three decorative zones, the percentages of the occupied areas of the first pattern areas had a constant value.

The common specifications are as follows:
First pattern area:
uneven surface formed by linear pattern elements (ridges)
arrangement pitches P1 of ridges: 0.14 degrees groove depths Dl: 0.3 mm
second pattern area:
smooth surface
First boundaries: parallel to reference center line
First boundaries' lengths: 1 to 5 times second boundaries' length The test tires each had convexoconcave occurred on the outer surface of the sidewall portions due to the overlap jointing of circumferential ends of a carcass ply strip forming the carcass ply.

Each test tire was evaluated with respect to about whether the convexoconcave was unnoticeable, the appearance of the sidewall portions, and the production cost of the vulcanization mold. The test methods are as follows.

<Unnoticeableness of Convexoconcave> one hundred examining staff observed the outer surface of the sidewall portion of each test tire and rated unnoticeableness of the convexoconcave. The ratings of the one hundred examining staff were averaged and are indicated in Table 1 by an index based on the undermentioned comparative example tire Ref. 2 in Test D being 100, wherein the higher the value, the more the unnoticeable. Incidentally, when the value is greater than 110, it is difficult to feel the existence of the convexoconcave by touching the outer surface of the sidewall portion with hands.

<Appearance of Decorative Portion>

The one hundred examining staff observed each test tire from a distance of one meter sideway from the sidewall portion and rated the degree of change in the pattern of the decorative portion and the degree of conspicuousness of the decorative portion. The ratings of the one hundred examining staff were averaged and are indicated in Table 1 by an index based on the undermentioned comparative example tire Ref. 2 in Test D being 100, wherein the higher the value, the better the appearance of the decorative portion. Incidentally, the values greater than 110 show that the decorative portion is very excellent in the design aspect.

<Manufacturing Time of Vulcanization Mold>

The time required to produce dies of the tire vulcanization mold for forming the decorative portion was measured. The results are indicated in Table 1 by an index based on the undermentioned comparative example tire Ref. 2 in Test D being 100, wherein the higher the value, the shorter the production time, wherein the values greater than 80 are acceptable.

TABLE 1

| Tire | Ref.1 | Ex.1 | Ex.2 | Ex.3 | Ex.4 | Ex.5 | Ex.6 |
|---|---|---|---|---|---|---|---|
| decorative zone number N | — | 3 | 3 | 3 | 3 | 3 | 3 |
| percentage of the occupied area of first pattern area | | | | | | | |
| first decorative zone | 50 | 20 | 25 | 30 | 35 | 40 | 50 |
| second decorative zone | 50 | 45 | 50 | 55 | 60 | 65 | 75 |
| third decorative zone | 50 | 70 | 75 | 80 | 85 | 90 | 100 |
| first ratio | 1 | 2.25 | 2.00 | 1.83 | 1.71 | 1.63 | 1.50 |
| second ratio | 1 | 1.56 | 1.50 | 1.45 | 1.42 | 1.38 | 1.33 |
| unnoticeableness | 90 | 113 | 120 | 123 | 130 | 138 | 125 |

TABLE 1-continued

| Tire | Ref.1 | Ex.1 | Ex.2 | Ex.3 | Ex.4 | Ex.5 | Ex.6 |
|---|---|---|---|---|---|---|---|
| appearance | 85 | 114 | 121 | 124 | 132 | 137 | 124 |
| manufacturing time | 110 | 96 | 96 | 96 | 95 | 93 | 95 |

From the test results, it was confirmed that, in the working example tires, the convexoconcave of the sidewall portions could be made less noticeable, and the appearance of the sidewall portions was improved as compared to the comparative example tire Ref. 1. Further, in the working example tires, the vulcanization mold manufacturing time was fallen in the acceptable range of greater than 80.

[Test B]

Pneumatic tires of size 225/45ZR18 having the internal structure shown in FIG. 1 were experimentally manufactured as test tires (working example tires Exs. 4 and 7-12), changing the lengths of the first boundaries relative to the length of the second boundaries as shown in Table 2, without changing the percentages of the occupied area of the first pattern areas as follows.

The common specifications are as follows:
First pattern area:
  uneven surface formed by linear pattern elements (ridges)
    arrangement pitches P1 of ridges: 0.14 degrees
    groove depth Dl: 0.3 mm
Second pattern area:
  smooth surface
First boundaries: parallel to reference center line
Decorative zones: N=3
Percentage of occupied area of first pattern area
  first decorative zone: 30%
  second decorative zone: 55%
  third decorative zone: 80%

The test tires each had convexoconcave occurred on the outer surface of the sidewall portions due to the overlap jointing of circumferential ends of the carcass ply strip forming the carcass ply.

Each test tire was evaluated with respect to about whether the convexoconcave was unnoticeable, the appearance of the sidewall portions, and the production cost of the vulcanization mold. The test methods were the same as explained above in Test A. The test results are shown in Table 2.

TABLE 2

| Tire | Ex.7 | Ex.8 | Ex.4 | Ex.9 | Ex.10 | Ex.11 | Ex.12 |
|---|---|---|---|---|---|---|---|
| first boundaries' lengths relative to second boundaries' length (times) | 1-3 | 1-4 | 1-5 | 1-6 | 1-8 | 1-10 | 1-12 |
| unnoticeableness | 109 | 118 | 123 | 126 | 129 | 120 | 115 |
| appearance | 108 | 120 | 124 | 125 | 126 | 121 | 118 |
| manufacturing time | 98 | 97 | 96 | 96 | 95 | 96 | 95 |

From the test results, it was confirmed that, in the working example tires, the convexoconcave of the sidewall portions could be made less noticeable, and the appearance of the sidewall portions was improved as compared to the comparative example tire Ref. 1 in Test A. Further, in the working example tires, the vulcanization mold manufacturing time was fallen in the acceptable range of greater than 80.

[Test C]

Pneumatic tires of size 225/45ZR18 having the internal structure shown in FIG. 1 were experimentally manufactured as test tires (working example tires Exs. 4 and 13-15), changing the surface aspects of the first pattern area and the second pattern area as shown in Table 3, and the directions of the first boundaries as follows, without changing the percentages of the occupied area of the first pattern areas. In the working example tires Exs. 4, 13 and 14, the first pattern area and the second pattern area were partitioned by the first boundaries extending parallel to the reference center line. In the working example tire Ex. 15, the first pattern area and the second pattern area were partitioned by the first boundaries extending radially of the rotational axis of the tire.

The common specifications are as follows
Uneven surface
  formed by linear patterns (ridges)
    arrangement pitches P1 of ridges: 0.14 degrees
    groove depth Dl: 0.3 mm
First boundaries' lengths: 1 to 5 times Second boundaries' length
Decorative zones: N=3
Percentage of occupied area of first pattern area
  first decorative zone: 30%
  second decorative zone: 55%
  third decorative zone: 80%

The test tires each had convexoconcave occurred on the outer surface of the sidewall portions due to the overlap jointing of circumferential ends of the carcass ply strip forming the carcass ply.

Each test tire was evaluated with respect to about whether the convexoconcave was unnoticeable, the appearance of the sidewall portions, and the production cost of the vulcanization mold. The test methods were the same as explained above in Test A. The test results are shown in Table 3.

TABLE 3

| Tire | Ex.4 | Ex. 13 | Ex. 14 | Ex. 15 |
|---|---|---|---|---|
| first pattern area | linear pattern elements | smooth | micro-protrusions | linear pattern elements |
| second pattern area | smooth | linear pattern elements | smooth | smooth |
| first boundaries | parallel | parallel | parallel | radial |
| unnoticeableness | 123 | 115 | 120 | 115 |
| appearance | 124 | 120 | 123 | 114 |
| manufacturing time | 96 | 96 | 95 | 93 |

From the test results, it was confirmed that, in the working example tires, the convexoconcave of the sidewall portions could be made less noticeable, and the appearance of the sidewall portions was improved as compared to the comparative example tire Ref. 1 in Test A. Further, in the working example tires, the vulcanization mold manufacturing time was fallen in the acceptable range of greater than 80.

[Test D]

Pneumatic tires of size 225/45ZR18 having the internal structure shown in FIG. 1 were experimentally manufactured as test tires (working example tires Exs. 4 and 16-20 and comparative example tire Ref. 2), changing the number N of the decorative zones as shown in Table 4, wherein the percentage of the occupied area of the first pattern area in the decorative zone was gradually increased from the radially innermost decorative zone to the radially outermost decorative zone.

The common specifications are as follows

First pattern area:
  uneven surface formed by linear pattern elements (ridges)
    arrangement pitches P1 of ridges: 0.14 degrees
    groove depth Dl: 0.3 mm second pattern area:
  smooth surface First boundaries: parallel to reference center line First boundaries' lengths: 1 to 5 times second boundaries' length Percentage of occupied area of first pattern area
  radially innermost decorative zone: 30%
  radially outermost decorative zone: 80%

The test tires each had convexoconcave occurred on the outer surface of the sidewall portions due to the overlap jointing of circumferential ends of the carcass ply strip forming the carcass ply.

Each test tire was evaluated with respect to about whether the convexoconcave was unnoticeable, the appearance of the sidewall portions, and the production cost of the vulcanization mold. The test methods were the same as explained above in Test A. The test results are shown in Table 4.

TABLE 4

| Tire | Ref.2 | Ex.4 | Ex.16 | Ex.17 | Ex.18 | Ex.19 | Ex.20 |
|---|---|---|---|---|---|---|---|
| number N of decorative zones | 2 | 3 | 4 | 5 | 8 | 9 | 10 |
| unnoticeableness | 100 | 123 | 134 | 136 | 140 | 145 | 147 |
| appearance | 100 | 124 | 130 | 132 | 135 | 138 | 140 |
| manufacturing time | 100 | 96 | 93 | 92 | 90 | 85 | 80 |

From the test results, it was confirmed that, in the working example tires, the convexoconcave of the sidewall portions could be made less noticeable, and the appearance of the sidewall portions was improved as compared to the comparative example tire Ref. 2 and the comparative example tire Ref. 1 in Test A. Further, in the working example tires, the vulcanization mold manufacturing time was fallen in the acceptable range of greater than 80.

DESCRIPTION OF THE REFERENCE SIGNS 1 pneumatic tire
3 sidewall portion
10 decorative portion
11 first pattern area
12 second pattern area
21 decorative zone
22 reference center line

The invention claimed is:

1. A pneumatic tire comprising:
a sidewall portion having an outer surface provided with a decorative portion extending in the circumferential direction of the tire in an arc shape, wherein
the decorative portion comprises a first pattern area having a first surface design, and a plurality of second pattern areas having a second surface design different from the first surface design of the first pattern area, and
the first pattern area and the second pattern areas are partitioned by first boundaries extending parallel to a reference center line which extends in a radial direction of the tire through the center in the tire circumferential direction of the decorative portion when viewed perpendicularly and second boundaries extending orthogonally to the reference center line, wherein
when a number N is an integer of 3 or more and the decorative portion is divided into the number N of decorative zones by parallel straight lines which are perpendicular to the reference center line so that, at the position of the reference center line, the decorative portion is divided into the number N equal parts by the parallel straight lines,
percentages of areas occupied by said first pattern area in the respective decorative zones gradually increase from the radially innermost one to the radially outermost one of the number N of the decorative zones at the position of the reference center line.

2. The pneumatic tire according to claim 1, wherein the first surface design of the first pattern area comprises linear pattern elements and/or micro-protrusions, and the second surface design of the second pattern areas comprises a substantially smooth surface.

3. The pneumatic tire according to claim 1, wherein the lengths of the first boundaries are greater than the lengths of the second boundaries.

4. The pneumatic tire according to claim 3, wherein the lengths of the first boundaries are not more than 10 times the lengths of the second boundaries.

5. The pneumatic tire according to claim 1, wherein a percentage of the occupied area of said first pattern area in the radially outermost decorative zone is in a range from 80% to 100%.

6. The pneumatic tire according to claim 5, wherein a percentage of the occupied area of said first pattern area in the radially innermost decorative zone is in a range from 30% to 50%.

7. The pneumatic tire according to claim 1, wherein
the decorative portion further comprises an inner decorative zone which is located more radially inward along the reference center than a first decorative zone which is radially innermost among the number N of the decorative zones, and which has the same dimension in the tire radial direction as the first decorative zone, and
the percentage of the area occupied by the first pattern area in the first decorative zone is greater than the percentage of the area occupied by the first pattern area in the inner decorative zone.

8. The pneumatic tire according to claim 1, wherein
the decorative zones include a first decorative zone which is innermost in said tire radial direction, a second decorative zone which is located on the outside in said tire radial direction of the first decorative zone, and a third decorative zones which is outermost in said tire radial direction, and
a first quotient of the percentage of the occupied area of said first pattern area in the second decorative zone divided by the percentage of the occupied area of said first pattern area in the first decorative zone is different from a second quotient of the percentage of the occupied area of said first pattern area in the third decorative zone divided by the percentage of the occupied area of said first pattern area in the second decorative zone.

9. The pneumatic tire according to claim 1, wherein the number N of the decorative zones is 3, and with respect to every two of the radially adjacent decorative zones, the occupied area percentage of the radially outer decorative zone is not less than 1.3 times but not more than 3.0 times the occupied area percentage of the radially inner decorative zone.

10. The pneumatic tire according to claim 1, wherein the second pattern areas include substantially H-shaped second pattern areas.

11. The pneumatic tire according to claim 1, wherein when the decorative portion is viewed perpendicularly thereto, the shapes of the micro-protrusions are circles, ovals or triangles, and the micro-protrusions have a protruding height H3 and widths/diameters W3 in a range from 0.01 mm to 0.3 mm.

12. The pneumatic tire according to claim 1, wherein the linear pattern elements are ridges extending radially of the rotation axis of the tire and arranged in the tire circumference direction.

13. The pneumatic tire according to claim 12, wherein the substantially smooth surfaces of the second pattern areas are at the same protruding height of the ridges.

14. The pneumatic tire according to claim 13, wherein the ridges each have a trapezoidal cross-sectional shape.

15. A pneumatic tire comprising:

a sidewall portion having an outer surface provided with a decorative portion extending in the circumferential direction of the tire in an arc shape, wherein the decorative portion comprises a first pattern area having a first surface design, and a plurality of second pattern areas having a second surface design different from the first surface design of the first pattern area, and wherein when a number N is an integer of 3 or more and the decorative portion is divided into the number N of decorative zones by parallel straight lines which are perpendicular to a reference center line which extends in a radial direction of the tire through the center in the tire circumferential direction of the decorative portion when viewed perpendicularly so that, at the position of the reference center line, the decorative portion is divided into the number N equal parts by the parallel straight lines, percentages of areas occupied by said first pattern area in the respective decorative zones gradually increase from the radially innermost one to the radially outermost one of the number N of the decorative zones at the position of the reference center line, wherein the first surface design of the first pattern area comprises linear pattern elements and/or micro-protrusions, and the second surface design of the second pattern areas comprises a substantially smooth surface.

16. The pneumatic tire according to claim 15, wherein the first pattern area and the second pattern areas are partitioned by first boundaries extending parallel to the reference center line and second boundaries extending orthogonally to the reference center line.

17. The pneumatic tire according to claim 15, wherein the number N of the decorative zones is 3, and with respect to every two of the radially adjacent decorative zones, the occupied area percentage of the radially outer decorative zone is not less than 1.3 times but not more than 3.0 times the occupied area percentage of the radially inner decorative zone.

18. The pneumatic tire according to claim 15, wherein the decorative portion further comprises an inner decorative zone which is located more radially inward along the reference center line, than a first decorative zone which is radially innermost among the number N of the decorative zones, and which has the same dimension in the tire radial direction as the first decorative zone, and the percentage of the area occupied by the first pattern area in the first decorative zone is greater than the percentage of the area occupied by the first pattern area in the inner decorative zone.

19. The pneumatic tire according to claim 15, wherein the decorative zones include a first decorative zone which is innermost in said tire radial direction, a second decorative zone which is located on the outside in said tire radial direction of the first decorative zone, and a third decorative zones which is outermost in said tire radial direction, and a first quotient of the percentage of the occupied area of said at least one first pattern area in the second decorative zone divided by the percentage of the occupied area of said at least one first pattern area in the first decorative zone is different from a second quotient of the percentage of the occupied area of said at least one first pattern area in the third decorative zone divided by the percentage of the occupied area of said at least one first pattern area in the second decorative zone.

20. The pneumatic tire according to claim 15, wherein the decorative portion comprises a plurality of the second pattern areas including substantially H-shaped second pattern areas.

* * * * *